(12) United States Patent
Hachard et al.

(10) Patent No.: US 10,711,612 B2
(45) Date of Patent: Jul. 14, 2020

(54) METHOD FOR MANUFACTURING A ROTOR FOR A TURBINE ENGINE HIGH-PRESSURE COMPRESSOR

(71) Applicant: SAFRAN AIRCRAFT ENGINES, Paris (FR)

(72) Inventors: Arnaud Hachard, Moissy-Cramayel (FR); Jérémy Marchand, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 104 days.

(21) Appl. No.: 16/146,087

(22) Filed: Sep. 28, 2018

(65) Prior Publication Data

US 2019/0120055 A1 Apr. 25, 2019

(30) Foreign Application Priority Data

Sep. 29, 2017 (FR) ..................................... 17 59147

(51) Int. Cl.
*F01D 5/02* (2006.01)
*F01D 5/06* (2006.01)
*B23P 15/00* (2006.01)
*F04D 29/64* (2006.01)
(Continued)

(52) U.S. Cl.
CPC ............ *F01D 5/025* (2013.01); *B23P 11/025* (2013.01); *B23P 15/006* (2013.01); *F01D 5/06* (2013.01); *F04D 29/321* (2013.01); *F04D 29/644* (2013.01); *F05D 2230/40* (2013.01);
(Continued)

(58) Field of Classification Search
CPC .......... F01D 5/025; F01D 5/06; B23P 15/006; B23P 11/025; F04D 29/644; F04D 29/321; F05D 2230/50; F05D 2260/37; F05D 2230/40; F05D 2230/60
See application file for complete search history.

(56) References Cited

U.S. PATENT DOCUMENTS 4,635,336 A * 1/1987 Ades ..................... B23P 11/025
29/252
5,220,784 A * 6/1993 Wilcox .................. B63H 21/16
416/198 A
(Continued)

FOREIGN PATENT DOCUMENTS

EP 1591623 A2 11/2005
EP 3170988 A1 5/2017
(Continued)

OTHER PUBLICATIONS

French Application No. 1759147, Search Report and Written Opinion dated Jun. 15, 2018, 8 pgs. (in French, relevance found in citations).

*Primary Examiner* — Ryan J. Walters
(74) *Attorney, Agent, or Firm* — Lathrop GPM LLP (57) ABSTRACT

The invention relates to the manufacturing of a rotor (23) of a high-pressure compressor. Various installation constraints are proposed in terms of temperature, angle and unevenness and/or runout defects to be considered. For example, when installing the sealing disk (25) on the first drum (27) of the rotor and/or the intermediate disk (29) on the first drum assembled with the sealing disk, axial packing (X1) is applied with a pressure ranging from 40 to $60 \times 10^5$ Pa.

15 Claims, 4 Drawing Sheets

(51) Int. Cl.
  *B23P 11/02* (2006.01)
  *F04D 29/32* (2006.01)
(52) U.S. Cl.
  CPC ...... *F05D 2230/50* (2013.01); *F05D 2230/60* (2013.01); *F05D 2260/37* (2013.01)

(56) References Cited

U.S. PATENT DOCUMENTS

| | | | |
|---|---|---|---|
| 7,147,436 B2* | 12/2006 | Suciu | F01D 5/025 |
| | | | 415/216.1 |
| 10,273,972 B2* | 4/2019 | Maalouf | F02C 3/04 |
| 2017/0138368 A1* | 5/2017 | Maalouf | F02C 3/04 |

FOREIGN PATENT DOCUMENTS

| | | |
|---|---|---|
| GB | 770120 A | 3/1957 |
| JP | 2008223541 A | 9/2008 |

\* cited by examiner

METHOD FOR MANUFACTURING A ROTOR FOR A TURBINE ENGINE HIGH-PRESSURE COMPRESSOR

CROSS-REFERENCE TO RELATED APPLICATION

This application claims priority to French Patent Application No. 1759147, filed Sep. 29, 2017, which is incorporated herein by reference.

SUMMARY OF THE INVENTION

The present invention relates to a method for manufacturing a compressor rotor for an aircraft gas turbine engine having at least two drums.

Such a rotor, having an axis of rotation (hereinafter X1), is of the type comprising the following parts axially (axis X1) installed in a stack (or more generally axially installed one against another):
a sealing disk, for the seal between said compressor rotor and a combustion chamber, the sealing disk having mounting flanges,
at least one first rotor disk (hereinafter drum 27, or disk 270 hereafter), to be assembled with the sealing disk using the mounting flanges,
an intermediate disk comprising a stage of intermediate blades,
at least one second rotor disk (hereinafter drum 31, or disk 310 hereafter) defining rotor blade stages with said at least one first rotor disk and the intermediate disk,
an upstream portion of a high-pressure connecting shaft between said compressor rotor and a turbine, and
a primary disk defining the first of the rotor blade stages.

The above will advantageously apply and in particular in the following case with at least the first two of the following characteristics, related to an assembly of difficult to assemble parts, on a complex compressor:
said at least one first rotor disk takes the form of a succession of consecutive rotor disks defining a first rotor drum,
said at least one second rotor disk takes the form of a succession of consecutive rotor disks defining a second rotor drum,
the compressor is a high-pressure compressor, said upstream portion of the shaft thus being that of a high-pressure shaft,
the sealing disk and the intermediate disk each having an outer diameter that is at least three times larger than their maximum width,
the rotor drums and the primary disk each are integral. The primary disk is an integral bladed disk.

An essential condition when establishing the stack of parts (or, more generally their axial installation one against another) is to achieve minimum shaft line failure. Consequently, the aim is for the various aforementioned parts to be as perfectly coaxial one to another as possible. Runout (also called concentricity) defects between the parts and the unevenness defects on these parts must be limited as far as possible, in particular in areas where they are resting one against the other. Optimal rotor balance is aimed for as well as facilitating and securing part installation operations.

When installing said parts, they are stacked one on top of another (more generally, axially installed one against another) and then assembled together two by two.

However, currently, it happens far too frequently that the rotor must be disassembled and reassembled due to issues with out-of-tolerance installation, which leads to considerable loss of time in cycle times. Moreover, for parts of turbine engines that have already flown, it may happen that the maintenance centres do not (no longer) have the original dimensional data, when there may have been a derogation to validate a departure from the specifications. These unknown differences lead to difficulties when reassembling.

One solution proposed by the present invention to at least part of the aforementioned problems is that the following operations are carried out in the manner indicated below, at the times specified below:
when installing the sealing disk on (or against) said at least one first rotor disk and/or the intermediate disk on (or against) said at least one first rotor disk assembled with the sealing disk, axial packing (X1) is applied with a pressure ranging from $40\times10^5$ to $60\times10^5$ Pa,
prior to assembling the sealing disk with said at least one first rotor disk, the sealing disk is heated to a temperature ranging from 80° C. to 140° C.,
when installing the intermediate disk on (or against) said at least one first rotor disk assembled with the sealing disk, the intermediate disk is heated to a temperature ranging from 120° C. to 160° C., and then axial packing is applied with a pressure ranging from $40\times10^5$ to $60\times10^5$ Pa,
when installing said at least one second rotor disk on the intermediate disk assembled with the at least one first rotor disk, itself assembled with the sealing disk:
  a) axial packing (X1) is applied with a pressure ranging from $40\times10^5$ to $60\times10^5$ Pa,
  b) said at least one second rotor disk is cooled down:
    b1) to a temperature ranging from −70° C. to −110° C., or
    b2) according to maximum outer diameters of the intermediate disk and of said at least one second rotor disk,
  c) the intermediate disk is not heated again unless, during step b), the cooling temperature of said at least one second rotor disk was less than −130° C., to within 10° C. (NOTA: "Not heating again" means remaining the considered piece, i.e. the intermediate disk, at the temperature at which it stands (presently the temperature at the end of step b1) or b2)), with no further heating of said considered piece, i.e. the intermediate disk).

This will thus limit the risk of detachment of the intermediate disk. It should be noted that cooling to a temperature of −133/−137° C. of said at least one second rotor disk already entails a risk of misalignment when clamping and a risk of deformation when packing. If the temperature is out of tolerance, there thus is a risk of needing to disassemble said at least one second rotor disk with the subsequent risk of detaching the intermediate disk. Furthermore, as said at least one second rotor disk and the intermediate disk have different outer diameters, this may have an impact on clamping (assembly). The measures of precaution proposed above limit the risks.

Since a specific issue has been noted on said at least one second rotor disk, accounting for its position in the stack, it is furthermore proposed that, during step b2), said at least one second rotor disk be cooled down according to the maximum outer diameters of the intermediate disk and of said at least one second rotor disk, thus according to the following formula:

$$T=[-(\emptyset D3-\emptyset D2+\text{clearance})/(\alpha*\emptyset D3)+\text{Tambiant}],$$

where:

T=cooling temperature in ° C.,

øD3=maximum outer diameter of said at least one second rotor disk in mm,

øD2=maximum outer diameter of the intermediate disk in mm, clearance=predefined constant (in m) ranging from 0.10 mm to 0.30 mm, α=expansion coefficient of the material of said at least one second rotor disk [° C.$^{-1}$], Tambiant=temperature of the working environment in ° C.

Furthermore, over or under-deforming the parts must be avoided during their installation. Excessively cumulating installation defects, part after part, on one same rotor must be avoided.

One corollary problem that has come to light concerns the manner in which the issue with a shaft line failure is handled by using existing measuring and testing equipment.

On a high-pressure rotor, the front face (or upstream face, facing the fan with which the turbine engine shown is equipped), corresponding to that of said upstream portion of the high-pressure shaft, is provided to be engaged through the low-pressure compressor of the turbine engine, a low-pressure shaft, which links together the compressor and the low-pressure turbine, passing through the high-pressure shaft. The rear face of the rotor is fastened to the turbine engine's combustion chamber via the sealing disk.

One general goal of the assembled installation being to stack the rotor parts with minimal shaft line failure, this failure can be measured using a system called "GENSPECT". The shaft line failure is calculated by combining, typically by cumulating, the flatness and concentricity values of the upper and lower end faces of the assembled rotor. This failure is provided in millimetres with a predetermined maximum tolerance not to be exceeded, otherwise the installation of the parts must be started over.

In order to limit the frequency of such a situation and again to address at least part of the aforementioned issues, it is proposed that, prior to stacking all the parts, steps are provided in which, as parts of the rotor, the sealing disk, said at least one first and second rotor disks and the intermediate disk are characterized by the following:

performing concentricity and flatness measurements in order to define possible defects in terms of:
unevenness and/or runout, at the rotor ends, and/or
shaft line failure, it being defined by combining the flatness and concentricity values of said parts installed as an assembly,
determining the angle, around said axis of rotation (X1), where such said unevenness or runout (also called concentricity) defect is located,
and accounting for admissible tolerances of said measurements, so that installation angles of said parts one in relation to another around said axis of rotation are deduced from the measurements and admissible tolerances, in order for the stack to be executed within the shaft line tolerance, and then, the parts are stacked, while observing said installation angles.

If the following parts are concerned, the above will apply as follows:

the bladed disk, whether it is integral or not, will not be concerned, said upstream portion of the shaft thus providing the connection between a high-pressure compressor rotor and a turbine that also is high pressure must also be characterized as above.

That being said, measurement errors may be induced by the current state of the rotor, in particular, if it comes from a turbine engine that has already flown. Moreover, it has been found that these measurement errors could be related to repeatability and reproducibility issues: It has been observed that the variability of the measurement is greater when a certain tolerance is exceeded. These errors have an impact on the quality of the entire assembly.

In order to limit these drawbacks and to adjust the tolerance according to prior analysis of the measurement equipment, it is proposed that the aforementioned characterizations of said parts with definition of admissible tolerances, include sub-steps wherein:

a surface to be measured is cleaned with a degreasing agent, and the concentricity and flatness measurements are performed and said angle where one said runout and/or unevenness defect is located is determined, and this:
after having previously performed and entered into the memory of a computer used to perform the measurements, several measurements at least of concentricity, flatness and of said angle where one said defect is located, these measurements being performed on other compressor rotors of the same type (high pressure if such is the case),
and having deducted from these the admissible tolerances to be considered.

Concerning the sealing disk, it has been found that there was a specific risk of excessive deformation in conjunction with its installation, due to the low thickness; for example, the part may have a (maximum) outer diameter of about 35 to 45 cm and an (axial) thickness of 7 to 12 cm. It has been found that this sealing disk may not expand enough if it is not sufficiently heated during installation, knowing that the reverse effect (a sealing disk that expands too much) may occur if the heating temperature is too high. It should also be noted that potential "umbrella" effects may occur at times.

An "umbrella" effect is a non-homogeneous deformation of the part due to localized heating. The maximum deformation is located at the outer corona of the disk.

It is also proposed that the aforementioned method be such that the step in which the sealing disk is heated to a temperature ranging from 100° C. to 140° C. includes either of the following:

heating of at least the mounting flanges of said sealing disk to a temperature ranging from 100° C. to 120° C., or
heating several locations of said sealing disk, or
heating said sealing disk using an oven.

These solutions limit all or part of the aforementioned issues.

And this will be even more so verified if—for issues comparable to the ones mentioned for sealing disks that feedback from the field has also reported concerning intermediate disks—the intermediate disk is heated in an oven and/or in several locations of the intermediate disk away from the mounting flanges of this intermediate disk, when installing an intermediate disk on said at least one first rotor disk assembled with the sealing disk.

One approach for optimizing installation conditions has also been conducted in view of controlling tolerances. The objective is to calculate angles for installing each part one on top of another in order to maintain the assembly within the shaft line tolerance as far as possible, while avoiding the crankshaft effect (crankshaft-shaped shaft line, potentially creating unbalance). Software may define/calculate these angles based on the unevenness and runout defect data of the parts. Another objective is to also obtain the angle and value of the defect after each part is installed up to the final value for the entire rotor. The parts are then stacked one on top of another following the angles provided by the calculations.

Within this context, it is more specifically proposed that based on:

the aforementioned characterizations of said parts of the compressor rotor concerned, the determined angles where said unevenness and/or runout defects are located, and the consideration of the admissible tolerances of said measurements, the installation angle of each said part and the values of said defects after installation of each part are predicted prior to stacking said parts.

In connection with the above, to obtain a shaft line within the tolerance, among others making the mistake of opposing the unevenness and/or runout defects of each part will thus be avoided by thereby seeking to cancel out these defects. This method may in fact cause a crankshaft-shaped shaft line to be generated, as mentioned above.

Based on the feedback from the field, this will be even more so avoided with the characteristics below, if, still concerning the sealing disk, it is otherwise found that a risk of failure to observe the tolerance may remain.

Therefore, it is subsidiarily proposed that said sealing disk having already been installed against said at least one first rotor disk, if, concerning at least some of said parts remaining to be installed, the values between the installation angles, deducted from the measurements and from the admissible tolerances, and the predicted installation angles display a difference greater than or equal to at least 30° for the installation of the sealing disk, and, if the difference between the measured values of said defects and the predicted values is less than or equal to a value ranging from 0.01 to 0.05 mm, then a prediction step is carried out again, without removing the sealing disk, for the installation angle measurements of each remaining part and the values of said defects after the installation of each remaining part then having been carried out with said remaining parts, among which one subassembly formed by the sealing disk installed together with said at least one first rotor disk, if, however, the difference between the measured values of said defects and the predicted values is greater than or equal to a value ranging from 0.01 to 0.05 mm, the parts that have already been stacked are removed and stacking is started over.

Concerning the installation of said upstream portion of the shaft in question, it has been found that there may be a specific risk of deviation in the sequence of dimensions following a known procedure for reading dimensions prior to installation on this said upstream portion of the shaft in question.

One proposed solution, which has brought a beneficial effect to the reliability of the installation and to the minimization of rejects, consists in the following:

during installation of said upstream portion of the shaft in question, heating this portion to a temperature ranging from 120° C. to 140° C., and, after a clamped assembly between said upstream portion of the shaft in question and the assembled stack already produced, carrying out a reading of the dimension on an upper end of said upstream portion of the shaft, the assembly being assumed to be in a vertical position.

Now, concerning the installation of the primary disk, there is a risk of damaging the part during handling, especially if it is removed following an out-of-tolerance assembly.

Consequently, the following is proposed:

prior to installing the primary disk, which is done axially around said upstream portion of the connecting shaft in question, the installations of said stacked parts already carried out are checked to ensure that they have been done within the tolerance of the shaft line, and, during said installation of the integral bladed disk, the primary disk is heated to a temperature ranging from 80° C. or 100° C. to 140° C.

The invention could be understood with further details, characteristics, and advantages upon reading the following description given by way of non-limiting example and with reference to the accompanying drawings.

DETAILED DESCRIPTION

Figure 1:
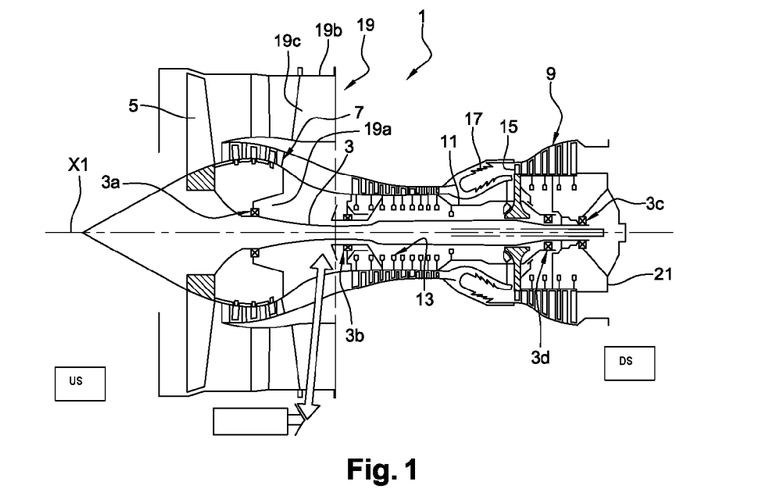
FIG. 1 shows an axial section of a general view of a twin spool turbojet engine to which the invention is likely to apply.

On FIG. 1, the aircraft turbine engine 1 shown comprises a first shaft 3 (called low-pressure or LP shaft) connecting a fan rotor 5 and the first stages 7 of the compressor (forming the low-pressure compressor) to the low-pressure turbine 9; this assembly forms the low-pressure or LP body. A second shaft 11 (called high-pressure or HP shaft), which is coaxial with the first shaft along the turbine engine's main axis of rotation X1, connects the high-pressure stages 13 of the compressor (forming the high-pressure compressor) to the high-pressure turbine 15; the assembly forms the high-pressure or HP body with the combustion chamber 17. The LP shaft 3 is supported, upstream (US), by the bearing 3a mounted on the so-called intermediate casing 19 and, downstream (DS), by the bearing 3c mounted on the exhaust case 21. The so-called high-pressure or HP shaft 11 is supported here by the bearing 3b of the intermediate casing 19 and, at the rear, by the high-pressure shaft 3, by means of the inter-shaft bearing 3b.

The intermediate casing includes a, radially external, shroud 19b provided with means for fastening it to the front of the aircraft and supporting the fan casing, as well as radial arms 19c that connect the hub 19a to the shroud 19b.

During operation, the engine sucks air through the fan which compresses it into a primary flow, which goes through the compression stages, the combustion chamber and the turbine stages and a secondary flow, which is ejected to the atmosphere while bypassing the combustion chamber. The turbines drive the compression means using the LP 3 and HP 11 shafts, respectively.

Figure 2:
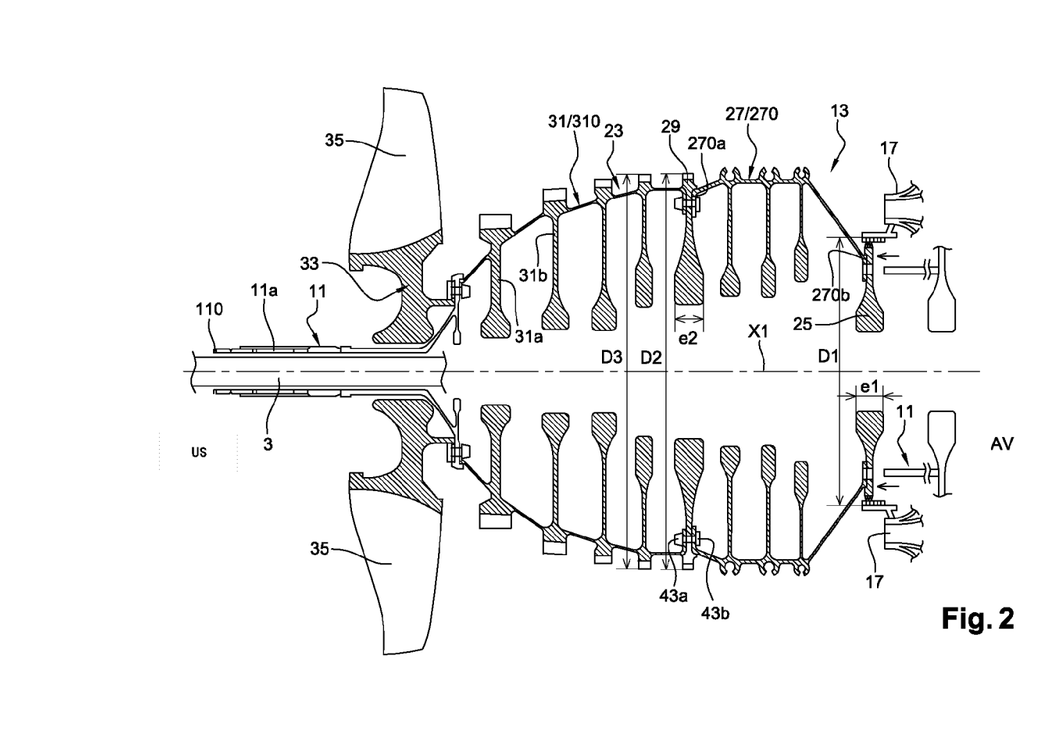
FIG. 2 is a schematic axial cross-section of a possible rotor in accordance with the one mentioned in the invention.

FIG. 2 thus schematically shows an example of a rotor 23 belonging to the high-pressure compressor 13.

The rotor 23, having for axis of rotation X1, is of the type comprising the following parts axially stacked one after the other from downstream to upstream:

a sealing disk 25 between this rotor 23 and the combustion chamber 17, said disk 25 being fastened to a first rotor drum 27 by means of mounting flanges, a first succession of consecutive rotor disks, which may be made of one piece, defining the first rotor drum 27, an intermediate disk 29 comprising an intermediate blade stage, interposed between the first rotor drum 27 and a second rotor drum 31, the sealing disk 25 and the intermediate disk 29 each having an outer diameter (see respectively diameters D1 and D2) that is at least three times greater than their maximum width (e1 and e2 respectively), a second succession of consecutive rotor disks made of one piece defining said second rotor drum 31, an upstream portion 11a of the high-pressure shaft 11 that is delimited by a distal end 110, and a bladed disk 33—blades 35—which can be integral, defining the first of the rotor's 23 blade stages, the first and second drums 27, 31 each comprising several blade stages (such as the stages 31a, 31b of the second drum 31).

As an alternative, the upstream portion 11a of the HP shaft 11 may include a configuration in which a disk is rigidly connected to the upstream portion 11a, without the disk 33 being integral (bladed).

The work performed here has therefore focused on the installation of these parts, since they are stacked successively one on top of the other following axis X1 which is then vertical, in the order specified below, as shown schematically in FIG. 3 (see successive steps from left to right and arrows indicating each stacking step), then assembled (axially clamped) two by two.

Figure 3:
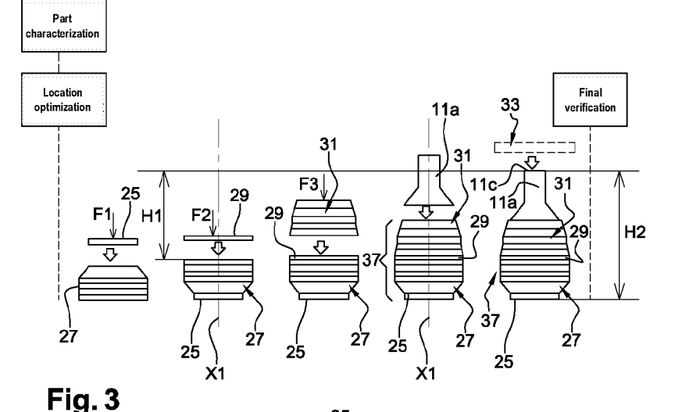
FIG. 3 shows successive installation steps (the dotted line of mark 33 indicates that it is an option).
Figure 4:
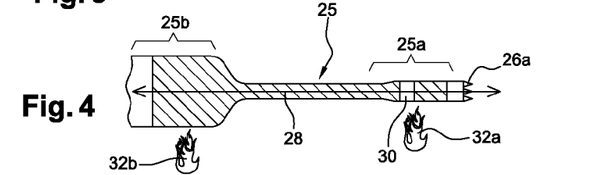
FIGS. 4 and 6 schematically show a sealing disk and an intermediate disk, respectively.
Figure 5:
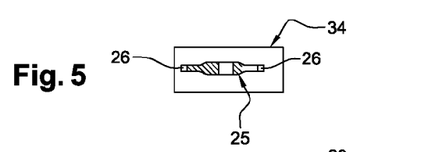
FIG. 5 schematically shows an oven.
Figure 6:
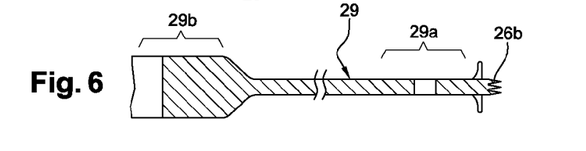

In this respect, the proposals of the invention are as follows:

a) as shown schematically all the way to the left on FIG. 3, during installation (thus prior to axial clamping of the two parts or group of parts respectively concerned one to another) of the sealing disk 25 on the first rotor drum 27 and/or of the intermediate disk 29 on the first rotor drum 27 assembled, clamped, with the sealing disk 25, it has already been proposed among others to axially pack the parts using a pressure F1 ranging from 40 to 60×10⁵ Pa. To apply an even pressure F1 on the entire part 25, a plate may be pressed on it with the help of hydraulic cylinders. This plate is removed once the part returns to an ambient temperature (20-25° C.); read below:

b) prior to assembling this sealing disk 25 with the first drum 27, by clamping at the flanges 25a (FIGS. 4, 6) close to the radially outer end of the disk where the knife edge seals 26a are located, it is in particular proposed, as schematically shown in FIGS. 4, 5, to heat the sealing disk 25 to a temperature ranging from 80° C. to 140° C., typically between 105 and 115° C. In this respect, it is specifically proposed that either of the following is provided:

heating at least the mounting flanges 25a to a temperature ranging from 100° C. to 120° C. (around the areas where the holes 30 for clamping the parts 25-27 with screws are located), or heating said sealing disk using an oven 34 (FIG. 5), or heating (marks 32a, 32b in FIG. 4) several locations of said sealing disk 25; this may be areas 25a and 25b (radially inner base area of the disk where it widens). The double arrow 28 schematically shows how the disk 25 is essentially kept flat due to multizone heating;

c) as schematically shown in FIG. 3, during installation of the intermediate disk 29 on the first drum 27, which itself is already assembled, clamped with the sealing disk 25, it is furthermore proposed that the intermediate disk 29 be heated to a temperature ranging from 120° C. to 160° C., typically between 130 and 150° C., and then to apply axial packing with a pressure ranging from 40 to 60×10⁵ Pa (cf. axial pressure F2 in FIG. 3). As above, it is also proposed that heating of the intermediate disk 29 then be carried out, with the same expected effect, in an oven (e.g. 34) and/or in several locations of the intermediate disk located away from the mounting flanges 29a of the intermediate disk: typically base area 29b, the intermediate disk 29 also being provided with knife edge seals 26b, at the radially outer end (cf. FIG. 6);

d) during installation of the second rotor drum 31 onto the intermediate disk 29, which is then already assembled (thus clamped) with the first drum 27, which itself is assembled with the sealing disk 25, the following is further proposed:

a) applying axial packing F3 (FIG. 3) with a pressure ranging in this case from 40 to 60×10⁵ Pa, performing a step b1) or b2) as described below, and c) not heating the intermediate disk 29 again unless, during step b2), the cooling temperature of the second drum 31a was less than −130° C., to within 10° C.

Concerning these steps b1), b2), preparatory or preliminary to engaging the second rotor drum 31 with the intermediate disk 29, they provide either of the following:

b1) cooling down the second drum 31 to a temperature ranging from −70° C. to −110° C., typically between −80° C. and −100° C., or b2) cooling down the second drum 31 to a temperature depending on the maximum outer diameters of the intermediate disk 29 and of the second drum 31 (see respective diameters D2, D3 in FIG. 2), in this case according to the following formula:

$$T=[-(\emptyset D3-\emptyset D2+\text{clearance})/(\alpha*\emptyset D3)+\text{Tambiant}],$$

where

T=cooling temperature in ° C.

ø D3=maximum outer diameter (cf. diameter D3) of the second drum 31, in mm, ø D2=maximum outer diameter of the intermediate disk 29 (cf. diameter D2), in mm, clearance=predefined constant ranging from 0.10 mm to 0.30 mm, α=expansion coefficient of the material of the second drum 31, in ° C.$^{-1}$ Tambiant=temperature of the working environment in ° C.

Typically, the axial pressures F1, F2, F3 will range from 45 to 55×10⁵ Pa.

Preferably, with a second drum 31 made of titanium with an expansion coefficient ranging from 9.5 to 10×10E−6, the cooling temperature of the second drum that would not require heating the intermediate disk 29 again would not be lower than −130° C., to within 10° C., for maximized flatness.

As already mentioned, in order to bring a beneficial effect to reliability of the installation and to the minimization of rejects, by limiting the cumulation of defects as the dimension line grows in length, the following is proposed:

that during the aforementioned installation of the upstream portion 11*a* of the high-pressure shaft 11 (preferably prior to presenting the part), this upstream portion 11*a* be heated to a temperature ranging from 120° C. to 140° C. and, after an assembly between this upstream shaft portion 11*a* and the already assembled stack (FIG. 3; clamped axial assembly 37), a reading of dimensions is performed using probes 39*a*, 39*b* (FIG. 7) on a free end, in this case upper 110 of this upstream portion 11*a*, the assembly 37 then still being arranged vertically.

It should be noted that when taken together, as it is advised, the above specificities not only make it possible to overcome an issue located where the mentioned subassembly(ies) of parts is located, but also to overcome the difficulty of the fact that all assembly steps had to be taken into consideration, since each one could indeed have an impact on the entire assembly.

That being said, another aspect has also been taken into consideration, which is related to the quality of the measurements aimed at ensuring that at each installation step the assembly tolerance has been observed and that there is no derivation leading the entire assembly to be out of tolerance.

In this respect, the importance of the following has been noted in particular:

adjusting the tolerance according to a prior analysis of the measuring equipment, which includes sensors 39*a* to 39*d* (FIG. 7), with position control and automated readings, and accounting for the repeatability and reproducibility of the operation of said measuring equipment in advance.

This is how it has been proposed that the rotor parts be characterized: preferably all except the integral bladed disk 33 (also called "blisk" for bladed disk) are measured in terms of concentricity and flatness. Measuring the part by probing makes it possible to specify the unevenness and runout defect.

The characterization will also favourably provide the angle (around axis X1) where the defect is located.

To this end, from a practical standpoint, it is provided that, prior to stacking all the parts 25, 27, 29, 31, 33, 11*a*, and except for what concerns disk 33, the following rotor 23 parts must be characterized by:

performing concentricity and flatness measurements in order to define possible defects in terms of:
  unevenness and/or runout, at the rotor ends 110, and/or
  shaft line failure (axis X1), it being defined by cumulating the flatness and concentricity values of said parts installed as an assembly,
  determining the angle (hereinafter $\underline{A}$) around said axis of rotation X1 where one said unevenness and/or runout defect is located,
  and accounting for admissible tolerances of said measurements.

Figure 7:
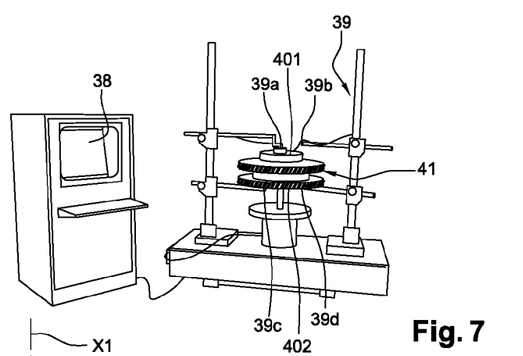
FIG. 7 schematically shows the structure of a GEN-SPECT system.

As a matter of fact, using the GENSPECT system, we are going to be able to have typically fours probes 39*a*, 39*b* and a rotating plate equipped with a chuck to install the part (FIG. 7). The operator places the probes on the surfaces to be measured and then makes the plate turn to begin reading. The probes are connected to the computer 38 in which the dedicated software computes the unevenness and the runout of the part, which provides the value of the part's maximum defect and the angle $\underline{A}$ where the defect can be found. The software computes the defect under consideration by combining the runout defect with the unevenness defect (in this case measures, i.e. by adding them together) with the remaining height until the end of the rotor has been reached (see height H1 for what concerns the future installation of the intermediate disk 29, FIG. 3). This computation makes it possible to plan the defect of the part at the final height $\underline{H2}$ of the complete rotor.

With the aforementioned software in the computing unit (computer) 38, connected to the also aforementioned measurement equipment 39 (cf. FIG. 7), we will thus be able to deduct from said measurements and from the admissible tolerances, the aforementioned respective angles $\underline{A}$ at which the parts are installed one in relation to another around the axis X1, in order for the stack to thus be executed within the shaft line tolerance, and this in advance before even the first part is placed.

And yet, measurement errors may be induced by a soiled surface condition (grease on the surfaces of the parts) and by reading errors, it having been observed that when you exceed a certain tolerance in the measurements, the variability, thus the inaccuracy, of each measurement is greater. It has therefore been decided to specifically calibrate the measurement equipment in advance.

We have thus planned to preferably proceed as follows:
use a degreasing agent (e.g. isopropanol) to clean each surface of parts to be measured, such as the upper and lower central bearing surfaces 401, 402 of the part 41 (FIG. 7), which could correspond to the bearing surfaces 270*a*, 270*b* (FIG. 2) if the part 27 was being measured, and perform the concentricity and flatness measurements, and determine said angle $\underline{A}$ where one said runout and/or unevenness defect is located:
  after having previously performed and entered into the memory of the computer 38, which exchanges with the measuring equipment 39, several measurements at least concentricity, flatness and said angle $\underline{A}$, these measurements being performed on other high-pressure compressor rotors of the same type (thus than that of 23), and having deducted from these the admissible tolerances to be considered.

This prior operation intended to optimize the quality of the measurements thus combines cleaning with a degreasing agent and a prior approach verifying the repeatability of the measuring instrumentation, this being typically done in a situation where used parts are assembled. Aside from cases where the instrumentation is modified (moving, changing probes, etc.), this should only have to be performed once when the assembly operation is industrialized.

Figure 10:
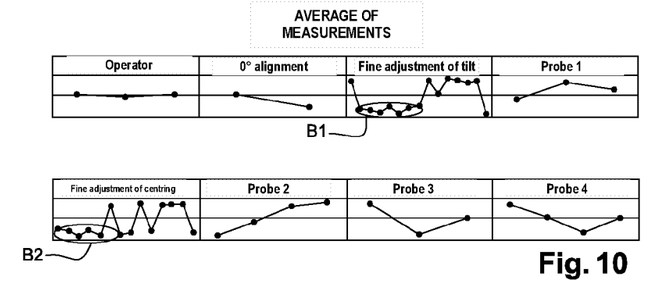
FIG. 10 schematically shows the results of measurements performed using defect probes

By performing the repeatability operation on the measurement of said "defect" (runout and/or unevenness), including the angle value (A), on several parts (e.g. at least three parts, thus coming from three different rotors) measured three times by at least two different operators. Implementation of this statistical method has led us to compute the reference average value based on those that were grouped in a reduced results field: areas B1 and B2 in FIG. 10, where the average measurement of the defect measured is found on the ordinate and the quality of the adjustments on the abscissa. The areas B1, B2 define the results to be selected to define said adjustment quality value, where the instrument's measuring stability is the best. The selected adjustment accuracy will allow for there not to be any deviation in the measurement of said defect. This test has made it possible to highlight the measuring equipment's adjustment quality in relation to other parameters (operators, probe placement, alignment of the top of the part). This test has made it possible to highlight the measuring equipment's adjustment quality in relation to other parameters.

Aside from the defect value with tolerance provided by the GENSPECT system, the predictive value A1 of the aforementioned angle A will be favourably provided, making it possible to locate the defect on the rotor.

It has thus been provided that based on the aforementioned characterizations of said rotor 23 parts, on the determined angles A where said unevenness and/or runout defects are located, and on the consideration of the admissible tolerances of the measurements provided by the probes, the aforementioned angle A1 at which each part is to be installed and the values of said defects after the installation of each part may be predicted, as already mentioned and prior to stacking said parts.

In this respect, in addition to the above, the GENSPECT system may also provide further "optimized stacking" data, which corresponds to a computation of the installation angles of each part one on top of another in order to remain within the shaft line tolerance, while avoiding said crankshaft effect. The software computes these angles based on the aforementioned defect of the parts defined in the previous step. It then also predicts said angle A1 and the value of the defect after installation of each part up to the final value on the complete rotor.

Figure 8:
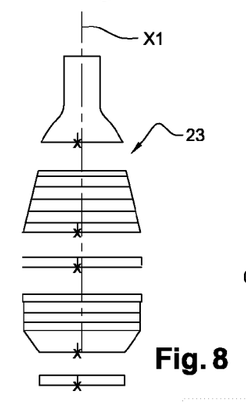
FIG. 8 schematically shows a stack of said rotor parts in the process of being installed.

And it is thus by following this data that it thus will be possible to stack the parts 25-11a one on top of another, where the operator marks each part at the predicted angle A1, this mark serving as a point of reference for stacking, since all the marks must be aligned (marks X in FIG. 8).

As already mentioned, each installation of a part requires that it is previously heated or cooled down, following the nature of the connection between the parts. A connection where a male diameter is inserted into a female diameter implies the cooling of the male part. A connection where a female diameter is inserted into a male diameter implies the heating of the female part. The return to the ambient temperature, and thus to the initial diameter, creates a natural clamping between the two diameters. Axial clamping using nuts and bolts, such as those in 43a, 43b (FIG. 3), is nevertheless still required.

Figure 9:
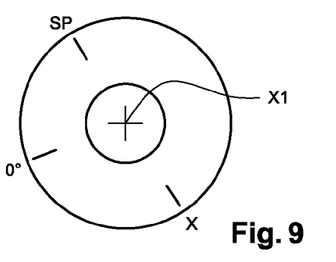
FIG. 9 schematically shows a part of the stack marked with installation marks.

Following the data provided by the GENSPECT system, the operator will in fact mark several angular positions on the parts (see FIG. 9):
SP: The angular location of angle A where the defect of the part concerned is located,
0°: The reference angle of the part,
X: The mark of the part's installation angle, as soon as the X of each part is stacked one on top of the other. To this may be added an "SPB" marking (not shown) used to mark the SP of a subassembly.

When stacking of the parts goes well, these markings aren't an issue, since the Xs merely need to be aligned.

However, the following case may arise in which the sealing disk 25 is already installed against the first drum 27.

In this case, it has been provided that:
if, on at least some of said parts remaining to be installed, there is a difference between the installation angles A, deducted from the measurements (probes) and from the admissible tolerances, and the predicted installation angles A1 that is greater than or equal to at least 30° (greater than 45° could be tolerated) for the installation of the sealing disk, and, if the difference between the measured values of said defects and the predicted values is less than or equal to a value ranging from 0.01 to 0.05 mm (e.g. 0.03/0.04 mm), to perform again, preferably, a prediction step, without removing the sealing disk 25, the planned readings (by probes 39a, etc.) of the installation angle of each remaining part and of the values of said defects A after the installation of each remaining part then being carried out with said remaining parts, including a subassembly formed by the sealing disk 25 installed together with the first drum 27.

If, however, the difference between the measured values of said defects and the predicted values is greater than or equal to a value ranging from 0.01 to 0.05 mm, removing the parts that have already been stacked and starting over the stack will be preferred.

Another special case that has been specifically addressed is the one in which:
prior to installing the disk 33, which is done axially around said upstream portion 11a of the high-pressure shaft, the installations of said stacked parts already carried out are checked to ensure that they have been done within the shaft line tolerance,
and, during said installation of this disk 33, said disk 33 is heated to a temperature ranging from 100° C. to 140° C.

The quality of the installation with thus be controlled and the risk of disassembly of the part, and thus of damage to the part, will be limited. It will furthermore be noted that in addition to the above in connection with the figures, said first and second rotor drums may each be limited to a single rotor disk, the drums and the primary disk of this rotor may not be integral, and/or the latter and the sealing disk may each have an outer diameter that is not necessarily at least three times larger than the maximum thickness, even if the aforementioned issues are even more so present when this is the case, when the drums and integral structures are present.

Thus, for example, the upstream portion 11a of the shaft 11 may include a configuration in which a disk is rigidly connected to the upstream portion 11a, without the disk being an integral bladed disk.

The invention claimed is:
1. A method for manufacturing a compressor rotor of an aircraft gas turbine engine having an axis of rotation and comprising the parts as follows, axially installed in a stack:
  a sealing disk, for the seal between said compressor rotor and a combustion chamber, the sealing disk having mounting flanges,
  at least one first rotor disk, to be assembled with the sealing disk using the mounting flanges,
  an intermediate disk comprising a stage of intermediate blades,
  at least one second rotor disk defining rotor blade stages with said at least one first rotor disk and the intermediate disk,
  an upstream portion of a connecting shaft between said compressor rotor and a turbine, and
  a primary disk defining a first one of the rotor blade stages,
wherein, when installing said parts, said parts are stacked one on top of another and then assembled together, and wherein:
  when installing the sealing disk on said at least one of said at least one first rotor disk and the intermediate disk on said at least one first rotor disk assembled with the sealing disk, an axial packing is applied with a pressure ranging from $40 \times 10^5$ to $60 \times 10^5$ Pa, prior to assembling the sealing disk with said at least one first rotor disk, the sealing disk is heated to a temperature ranging from 80° to 140° C., when installing the intermediate disk on said at least one first rotor disk assembled with the sealing disk, the intermediate disk is heated to a temperature ranging from 120° to 160° C., and then an axial packing is applied with a pressure ranging from $40\times10^5$ to $60\times10^5$ Pa, when installing said at least one second rotor disk on the intermediate disk assembled with the at least one first rotor disk, itself assembled with the sealing disk:
a) an axial packing is applied with a pressure ranging from $40\times10^5$ to $60\times10^5$ Pa,
b) said at least one second rotor disk is cooled down:
b1) either to a temperature ranging from −70° C. to −110° C.,
b2) or as a function of maximum outer diameters of the intermediate disk and of said at least one second rotor disk,
c) the intermediate disk is not heated again unless, during step b), the cooling temperature of said at least one second rotor disk was less than −130° C., to within 10° C.

2. The method according to claim 1, wherein:
said at least one first rotor disk takes the form of a succession of consecutive rotor disks defining a first rotor drum,
said at least one second rotor disk takes the form of a succession of consecutive rotor disks defining a second rotor drum.

3. The method according to claim 2, wherein:
prior to installing the primary disk, which is done axially around said upstream portion of the connecting shaft, the installations of said stacked parts already carried out are checked to ensure that they have been done within the tolerance of the shaft line, and,
during said installation of the primary disk, the primary disk is heated to a temperature ranging from 100° C. to 140° C.

4. The method according to claim 1, wherein, during step b2), said at least one second rotor disk is cooled down according to the maximum outer diameters of the intermediate disk and of said at least one second rotor disk, according to the following formula:

$$T=[-(\text{ø}D3-\text{ø}D2+\text{clearance})/(\alpha*\text{ø}D3)+\text{Tambiant}],$$

where:
T=cooling temperature in ° C.
øD3=maximum outer diameter of said at least one second rotor disk, in mm,
øD2=maximum outer diameter of the intermediate disk in mm,
clearance=predefined constant ranging from 0.10 mm to 0.30 mm,
α=expansion coefficient of the material of said at least one second rotor disk, in ° $C.^{-1}$,
Tambiant=temperature of a working environment in ° C.

5. The method according to claim 1, wherein:
prior to stacking all of said parts, it includes a step in which, as parts of the rotor, the sealing disk, said at least one first and second rotor disks and the intermediate disk are characterized by:
performing concentricity and flatness measurements in order to define possible defects in terms of:
concentricity and/or unevenness, at the rotor ends, and/or shaft line failure, such a shaft line failure being defined by combining the flatness and concentricity values of said parts installed as an assembly,
determining an angle (A), around said axis of rotation, where such said unevenness or concentricity defect is located, and,
accounting for admissible tolerances of said measurements,
so that installation angles of said parts one in relation to another around said axis of rotation are deduced from said concentricity and flatness measurements and from admissible tolerances, in order for the stack to be executed within a shaft line tolerance,
and then, said parts are stacked, while observing said installation angles.

6. The method according to claim 5, wherein the characterizations of said parts with said admissible tolerances include sub-steps in which:
a surface to be measured is cleaned with a degreasing agent, and
the concentricity and flatness measurements are performed and said angle (A) where one of said concentricity and/or unevenness defect is located is determined:
after having previously performed and entered into a memory of a computer used to perform the measurements, several measurements at least of concentricity, flatness and of said angle (A) where one said defect is located, such measurements being performed on other high-pressure compressor rotors, and,
having deducted from said several measurements the admissible tolerances to be considered.

7. The method according to claim 5, wherein, based on said characterizations of said compressor rotor parts, on said determined angles (A) where said concentricity and/or unevenness defects are located, and on the consideration of the admissible tolerances of said measurements, the installation angle of each said part and the values of said concentricity and/or unevenness defects after installation of each said part are predicted prior to stacking said parts.

8. The method according to claim 7, wherein the sealing disk having already been installed against said at least one first rotor disk,
if, between the installation angles of some at least of said parts remaining to be installed deducted from the measurements and the admissible tolerances, and the predicted installation angles, there is a difference greater than or equal to at least 30° for the installation of the sealing disk, and if the difference between the measured values of said concentricity and/or unevenness defects and the predicted values is less than or equal to a value ranging from 0.01 mm to 0.05 mm, a prediction step is repeated, without removing the sealing disk, for the installation angle measurements of each remaining part and the values of said defects after installing each remaining part being then carried out with said remaining parts, among which a subassembly consisting of the installed sealing disk with said at least one first rotor disk, and, if the difference between the measured values of said defects and the predicted values is greater than or equal to a value ranging from 0.01 mm to 0.05 mm, the parts that have already been installed are removed and stacking is started over.

9. The method according to claim 1, wherein step in which the sealing disk is heated to a temperature ranging from 80° C. to 140° C. includes either of the following:
heating of at least the mounting flanges of said sealing disk to a temperature ranging from 100° C. to 120° C.,
heating several locations of said sealing disk,
heating said sealing disk using an oven.

10. The method according to claim 1, wherein, when installing the intermediate disk on said at least one first rotor disk assembled with the sealing disk, heating of the intermediate disk is performed in an oven and/or in several locations on the intermediate disk located away from the mounting flanges of the intermediate disk.

11. The method according to claim 1, wherein, when installing said upstream portion of the connecting shaft, said upstream portion is heated to a temperature ranging from 120° C. to 140° C. and, after a clamped assembly between said upstream portion of the connecting shaft and the assembled stack already made, a reading of the dimensions is performed at an upper end of said upstream portion of the connecting shaft.

12. A method for manufacturing a compressor rotor of an aircraft gas turbine engine having an axis of rotation and comprising the parts as follows, axially installed one against another:
a sealing disk, for the seal between said compressor rotor and a combustion chamber, the sealing disk having mounting flanges,
at least one first rotor disk, to be assembled with the sealing disk using the mounting flanges,
an intermediate disk comprising a stage of intermediate blades,
at least one second rotor disk defining rotor blade stages with said at least one first rotor disk and the intermediate disk,
an upstream portion of a connecting shaft between said compressor rotor and a turbine, and
a primary disk defining a first one of the rotor blade stages,
wherein, when installing said parts, said parts are stacked one against another and then assembled together, and wherein:
when installing the sealing disk against said at least one of said at least one first rotor disk and the intermediate disk against said at least one first rotor disk assembled with the sealing disk, an axial pressure packing is applied thereon,
prior to assembling the sealing disk with said at least one first rotor disk, the sealing disk is heated,
when installing the intermediate disk against said at least one first rotor disk assembled with the sealing disk, the intermediate disk is heated, and then an axial pressure packing is applied thereon,
when installing said at least against second rotor disk on the intermediate disk assembled with the at least one first rotor disk, itself assembled with the sealing disk:
a) an axial pressure packing is applied thereon,
b) said at least one second rotor disk is cooled down:
b1) either to a temperature ranging from −70° C. to −110° C.,
b2) or as a function of maximum outer diameters of the intermediate disk and of said at least one second rotor disk,
c) the intermediate disk is not heated again unless, during step b), the cooling temperature of said at least one second rotor disk was less than −130° C., to within a range of 10° C.

13. The method according to claim 12, wherein:
said at least one first rotor disk takes the form of a succession of consecutive rotor disks defining a first rotor drum,
said at least one second rotor disk takes the form of a succession of consecutive rotor disks defining a second rotor drum.

14. The method according to claim 12, wherein, during step b2), said at least one second rotor disk is cooled down according to the maximum outer diameters of the intermediate disk and of said at least one second rotor disk, according to the following formula:

$$T=[-(\emptyset D3-\emptyset D2+\text{clearance})/(\alpha*\emptyset D3)+\text{Tambiant}],$$

where:
T=cooling temperature in ° C.
øD3=maximum outer diameter of said at least one second rotor disk, in mm,
øD2=maximum outer diameter of the intermediate disk in mm,
clearance=predefined constant ranging from 0.10 mm to 0.30 mm,
α=expansion coefficient of the material of said at least one second rotor disk, in ° $C.^{-1}$,
Tambiant=temperature of a working environment in ° C.

15. The method according to claim 12, wherein:
prior to axially installing said parts one against another, it includes a step in which, as parts of the rotor, the sealing disk, said at least one first and second rotor disks and the intermediate disk are characterized by:
performing concentricity and flatness measurements in order to define possible defects in terms of:
concentricity and/or unevenness, at the rotor ends, and/or
shaft line failure, such a shaft line failure being defined by combining the flatness and concentricity values of said parts installed as an assembly,
determining an angle (A), around said axis of rotation, where such said unevenness or concentricity defect is located, and,
accounting for admissible tolerances of said measurements, so that installation angles of said parts one in relation to another around said axis of rotation are deduced from said concentricity and flatness measurements and from admissible tolerances, in order for said axial installation of the parts to be executed within a shaft line tolerance,
and then, said parts are axially installed one against another, while observing said installation angles.

* * * * *